United States Patent
Jeong et al.

(10) Patent No.: US 9,635,700 B2
(45) Date of Patent: Apr. 25, 2017

(54) METHOD AND DEVICE FOR TRANSMITTING RANDOM ACCESS AND OTHER UPLINK CHANNELS OF OTHER CELL IN MOBILE COMMUNICATION SYSTEM CARRIER AGGREGATION

(71) Applicant: Samsung Electronics Co., Ltd., Gyeonggi-do (KR)

(72) Inventors: Kyeong In Jeong, Gyeonggi-do (KR); Gert Jan Van Lieshout, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/069,950

(22) Filed: Mar. 14, 2016

(65) Prior Publication Data

US 2016/0198496 A1    Jul. 7, 2016

Related U.S. Application Data

(63) Continuation of application No. 14/110,133, filed as application No. PCT/KR2012/002585 on Apr. 5, 2012, now Pat. No. 9,288,801.

(Continued)

(30) Foreign Application Priority Data

Apr. 5, 2012 (KR) .................. 10-2012-0035517

(51) Int. Cl.
*H04W 74/08* (2009.01)
*H04W 76/02* (2009.01)
(Continued)

(52) U.S. Cl.
CPC ......... *H04W 76/028* (2013.01); *H04L 1/1835* (2013.01); *H04L 1/1851* (2013.01);
(Continued)

(58) Field of Classification Search
CPC .................................................. H04W 76/028
(Continued)

(56) References Cited

U.S. PATENT DOCUMENTS 8,150,402 B2   4/2012   Panico et al.
8,369,209 B2   2/2013   Zhang et al.
(Continued)

FOREIGN PATENT DOCUMENTS

CN   101310546 A   11/2008
CN   103119996     5/2013
(Continued)

OTHER PUBLICATIONS

Text of the First Office Action dated Dec. 29, 2015 in connection with Chinese Patent Application No. 201280027416.1; 8 pages.
(Continued)

*Primary Examiner* — Melvin Marcelo
*Assistant Examiner* — Peter G Solinsky

(57) ABSTRACT

The present invention relates to a transmission of a random access in a specific cell from a plurality of serving cells in a mobile communication system using a carrier aggregation technology, and a method for efficiently transmitting uplink channels other than the random access in another cell. In particular, the method for a terminal to transmit an uplink channel to a base station comprises the steps of: confirming whether an uplink channel for a second carrier having an uplink timing different from a first carrier is included in a subframe transmitting a Random Access Preamble for the first carrier; if included, confirming whether the sum of the electric power required for the transmission of the random access preamble and the electric power required for the transmission of the uplink channel exceeds the maximum transmission electric power of the terminal; and, if exceeding, transmitting the random access preamble preferentially
(Continued)

before the uplink channel. In addition, the terminal for transmitting an uplink channel to a base station comprises: a transmitter/receiver for transmitting/receiving a signal to/from the base station; and a control unit for confirming whether the uplink channel for a second carrier having an uplink timing different from a first carrier is included in a subframe for transmitting a random access preamble for the first carrier, and if included, confirming whether the sum of the electric power required for transmitting the Random Access Preamble and the electric power required for transmitting the uplink channel exceeds the maximum transmission electric power of the terminal, and if exceeding, controlling the transmission so that the random access preamble is preferentially transmitted before the uplink channel.

20 Claims, 9 Drawing Sheets

Related U.S. Application Data

(60) Provisional application No. 61/471,872, filed on Apr. 5, 2011.

(51) Int. Cl.
<table><tr><td>H04L 5/00</td><td>(2006.01)</td></tr><tr><td>H04W 56/00</td><td>(2009.01)</td></tr><tr><td>H04L 1/18</td><td>(2006.01)</td></tr><tr><td>H04W 52/02</td><td>(2009.01)</td></tr><tr><td>H04W 52/36</td><td>(2009.01)</td></tr><tr><td>H04W 52/50</td><td>(2009.01)</td></tr><tr><td>H04W 74/00</td><td>(2009.01)</td></tr><tr><td>H04L 27/26</td><td>(2006.01)</td></tr><tr><td>H04W 48/08</td><td>(2009.01)</td></tr><tr><td>H04W 72/00</td><td>(2009.01)</td></tr><tr><td>H04W 72/04</td><td>(2009.01)</td></tr><tr><td>H04W 76/06</td><td>(2009.01)</td></tr><tr><td>H04W 88/08</td><td>(2009.01)</td></tr><tr><td>H04W 84/04</td><td>(2009.01)</td></tr></table>

(52) U.S. Cl.
CPC .......... *H04L 1/1854* (2013.01); *H04L 1/1874* (2013.01); *H04L 1/1883* (2013.01); *H04L 5/001* (2013.01); *H04L 5/0098* (2013.01); *H04W 52/0216* (2013.01); *H04W 52/0219* (2013.01); *H04W 52/367* (2013.01); *H04W 52/50* (2013.01); *H04W 56/001* (2013.01); *H04W 56/0005* (2013.01); *H04W 56/005* (2013.01); *H04W 56/0015* (2013.01); *H04W 56/0045* (2013.01); *H04W 72/042* (2013.01); *H04W 72/0413* (2013.01); *H04W 72/0446* (2013.01); *H04W 74/006* (2013.01); *H04W 74/085* (2013.01); *H04W 74/0833* (2013.01); *H04W 74/0858* (2013.01); *H04W 74/0891* (2013.01); *H04L 27/2662* (2013.01); *H04W 48/08* (2013.01); *H04W 72/00* (2013.01); *H04W 72/04* (2013.01); *H04W 72/0453* (2013.01); *H04W 76/068* (2013.01); *H04W 84/042* (2013.01); *H04W 88/08* (2013.01)

(58) Field of Classification Search
USPC ........................................................ 370/329
See application file for complete search history.

(56) References Cited

U.S. PATENT DOCUMENTS

| | | |
|---|---|---|
| 2009/0296591 A1 | 12/2009 | Urabe et al. |
| 2009/0316626 A1 | 12/2009 | Lee |
| 2010/0041428 A1 | 2/2010 | Chen et al. |
| 2011/0200032 A1 | 8/2011 | Lindstrom et al. |
| 2012/0030380 A1 | 2/2012 | Yanagimachi |
| 2012/0039182 A1 | 2/2012 | Zhou |
| 2012/0063302 A1 | 3/2012 | Damnjanovic et al. |
| 2012/0069788 A1 | 3/2012 | Shen et al. |
| 2012/0082107 A1 | 4/2012 | Ou |
| 2012/0113939 A1 | 5/2012 | Kim et al. |
| 2012/0127931 A1 | 5/2012 | Gaal et al. |
| 2012/0176967 A1* | 7/2012 | Kim ................ H04W 72/0413 370/328 |
| 2012/0250520 A1 | 10/2012 | Chen |
| 2012/0250630 A1 | 10/2012 | Paiva et al. |
| 2012/0300701 A1 | 11/2012 | Uemura et al. |
| 2012/0300715 A1* | 11/2012 | Pelletier ............ H04W 56/0005 370/329 |
| 2013/0058315 A1* | 3/2013 | Feuersanger ....... H04W 52/281 370/336 |
| 2013/0121203 A1 | 5/2013 | Jung et al. |
| 2013/0242911 A1 | 9/2013 | Heo |
| 2014/0016593 A1 | 1/2014 | Park |
| 2015/0189675 A1* | 7/2015 | Feuersaenger ...... H04W 52/281 370/329 |
| 2015/0229449 A1 | 8/2015 | Chun et al. |
| 2016/0081045 A1 | 3/2016 | Bostrom et al. |

FOREIGN PATENT DOCUMENTS

| | | |
|---|---|---|
| CN | 103141041 | 6/2013 |
| EP | 22144488 A1 | 8/2010 |
| EP | 2429252 A1 | 3/2012 |
| JP | 2011508559 | 3/2011 |
| WO | WO 2010/074504 A2 | 7/2010 |
| WO | WO 2010/107354 A1 | 9/2010 |
| WO | WO 2010/121708 A1 | 10/2010 |
| WO | WO 2010/127520 A1 | 11/2010 |
| WO | WO 2011/019256 A2 | 2/2011 |

OTHER PUBLICATIONS

Extended European Search Report dated Mar. 18, 2015 in connection with European Patent Application No. 12768341.5; 8 pages.
"Random Access Transmission with Priority in E-UTRA Uplink"; 3GPP TSG RAN WG1 I LTE Ad Hoc Mtg.; R1-060140; CCL/ITRI; Helsinki, Finland; Jan. 23-25, 2006; 5 pages.
"CA Support for Multi-TA"; 3GPP TSG-RAN2#69; R2-101567; E-Mail Rapporteur (NTT Docomo, Inc.); San Francisco, USA; Feb. 22-26, 2010; 12 pages.
International Search Report dated Oct. 29, 2012 in connection with International Patent Application No. PCT/KR2012/002585, 3 pages.
Written Opinion of International Searching Authority dated Oct. 29, 2012 in connection with International Patent Application No. PCT/KR2012/002585, 4 pages.
Chinese Office Action dated Dec. 28, 2016 in connection with Chinese Application No. 201280019532.9, 13 pages.
Chinese Office Action dated Feb. 4, 2017 in connection with Chinese Application No. 201280018523.8 dated Feb. 4, 2017, 16 pages.
Japanese Office Action dated Nov. 25, 2016 in connection with Japanese Application No. 2014-503599, 7 pages.
Extended European Search Report dated Dec. 8, 2016 in connection with European Application No. 12749443.3, 8 pages.
3GPP TS 36.331 V10.0.0, "3rd Generation Partnership Project; Technical Specification Group Radio Access Network; Evolved Universal Terrestrial Radio Access (E-UTRA); Radio Resource Control (RRC); Protocol Specification (Release 10)", Dec., 2010, 6 pages.
3GPP TS 36.321 V10.0.0, "3rd Generation Partnership Project; Technical Specification Group Radio Access Network; Evolved

(56) References Cited

OTHER PUBLICATIONS

Universal Terrestrial Radio Access (E-UTRA); Medium Access Control (MAC) Protocol Specification (Release 10)", Dec. 2010, 53 pages.
3GPP TS 36.321 V10.1.0, "3rd Generation Partnership Project; Technical Specification Group Radio Access Network; Evolved Universal Terrestrial Radio Access (E-UTRA); Medium Access Control (MAC) Protocol Specification (Release 10)", Mar. 2010, 53 pages.
Ericsson, et al., "Adding a Power Management Indication in PHR", 3GPP TSG-RAN2 Meeting #73, R2-110940, Taipei, Taiwan, Feb. 21-25, 2011, 4 pages.
E-mail rapporteur (NTT Docomo, Inc.), "CA Support for Multi-TA", 3GPP TSG-RAN2#69, R2-101567, San Francisco, CA, Feb. 22-26, 2010, 12 pages.

* cited by examiner

METHOD AND DEVICE FOR TRANSMITTING RANDOM ACCESS AND OTHER UPLINK CHANNELS OF OTHER CELL IN MOBILE COMMUNICATION SYSTEM CARRIER AGGREGATION

CROSS-REFERENCE TO RELATED APPLICATIONS AND CLAIM OF PRIORITY

The present application is a continuation of U.S. patent application Ser. No. 14/110,133, filed Oct. 4, 2013, which claims priority under 35 U.S.C. §365 to International Patent Application No. PCT/KR2012/002585 filed Apr. 5, 2012, entitled "METHOD AND DEVICE FOR TRANSMITTING RANDOM ACCESS AND OTHER UPLINK CHANNELS OF OTHER CELL IN MOBILE COMMUNICATION SYSTEM CARRIER AGGREGATION". International Patent Application No. PCT/KR2012/002585 claims priority under 35 U.S.C. §365 and/or 35 U.S.C. §119(a) to U.S. Provisional Patent Application No. 61/471,872 filed Apr. 5, 2011 and Korean Application No. 10-2012-0035517 filed Apr. 5, 2012, and which are incorporated herein by reference into the present disclosure as if fully set forth herein.

TECHNICAL FIELD

The present disclosure relates to a method for a terminal to transmit uplink channel to a base station in a wireless communication system supporting carrier aggregation. In more particular, the present disclosure relates to an uplink channel transmission method and apparatus for transmitting uplink channel when uplink transmission occurs in a cell at the same timing when a terminal transmits a random access preamble in a specific cell.

BACKGROUND ART

The mobile communication system has been developed for the user to communicate on the move. With the rapid advance of technologies, the mobile communication system has evolved to the level capable of providing high speed data communication service as well as voice telephony service. Recently, as one of the next generation mobile communication system, Long Term Evolution (LTE) is on the standardization by the 3$^{rd}$ Generation Partnership Project (3GPP). LIE is a technology designed to provide high speed packet-based communication of up to 100 Mbps and aims at commercial deployment around 2010 timeframe.

Meanwhile, unlike voice service, the data service is provided on the resource determined according to the data amount to be transmitted and channel condition. Accordingly, the wireless communication system, especially cellular communication, is provided with a scheduler manages transmission resource allocation in consideration of the required resource amount, channel condition, data amount, etc. This is the fact in the LTE system as the next generation mobile communication system, and the scheduler located at the base station manages the transmission resource allocation.

Recent studies are focused on the LTE-Advanced (LTE-A) for improving data rate with the adaptation of several new techniques to legacy LTE system. Carrier Aggregation (CA) is one of such technologies. CA is the technology that aggregates a plurality of carriers for uplink and downlink transmission between a User Equipment (UE) and an evolved Node B (eNB) so as to increases the data reception amount/reception data rate or transmission amount/transmission data rate in proportion to the number of aggregated carriers. In LTE, the cell operating on the main carrier frequency is referred to as Primary Cell (PCell) and the other cells operating on other frequency carriers are referred to as Secondary Cell (SCell).

Meanwhile, with the introduction of repeater and Remote Radio Head (RRH), the positions of antennas responsible for the radio transmission/reception change (e.g. the transmit/receive antennas for the secondary carrier may be located at the RRHs while the transmit/receive antennas for the primary carrier are located at the eNB) and, in this case, it is prefer to acquire the uplink transmission timing to a receive antenna near the terminal location rather than the uplink transmission timing to a receive antenna far from the terminal location.

This means that a plurality of uplink transmission timings may exist and thus there is a need of a method for managing carriers efficiently in a carrier aggregation scenario including a plurality of uplink transmission timings.

DISCLOSURE OF INVENTION

Technical Problem

The present disclosure has been conceived to solve the above problems. The present disclosure aims to provide a method and apparatus for transmitting uplink channel efficiently, especially when there is the uplink transmission in one cell at the same timing when the UE transmits the random access preamble in a specific cell.

Solution to Problem

In accordance with an aspect of the present disclosure, a method for a terminal to transmit uplink channels to a base station in a wireless communication system supporting carrier aggregation of at least one carrier includes determining whether a subframe carrying a random access preamble on a first carrier includes an uplink channel on a second carrier having an uplink timing different from the uplink timing of the first carrier, determining, when the uplink channel is included, whether a sum of transmit powers required for transmitting the Random Access Preamble and the uplink channel is greater than a maximum terminal output power, and transmitting, when the sum of the required transmit powers is greater than the maximum terminal output power, the Random Access Preamble with priority.

In accordance with another aspect of the present disclosure, a terminal for transmitting uplink channels to a base station in a wireless communication system supporting carrier aggregation of at least one carrier includes a transceiver which transmits and receives to and from the base station and a control unit which determines whether a subframe carrying a random access preamble on a first carrier includes an uplink channel on a second carrier having an uplink timing different from the uplink timing of the first carrier, determines, when the uplink channel is included, whether a sum of transmit powers required for transmitting the Random Access Preamble and the uplink channel is greater than a maximum terminal output power and controls transmitting, when the sum of the required transmit powers is greater than the maximum terminal output power, the Random Access Preamble with priority.

Advantageous Effects of Invention

According to the present disclosure, the UE is capable of transmitting the random access preamble or uplink channel efficiently when an uplink channel for a cell is included in the subframe carrying a random access preamble for a specific cell

MODE FOR THE INVENTION

The present disclosure proposes a method for handling a satiation where the random access transmission for a specific cell and uplink channel excluding a random access preamble (e.g. Physical Uplink Shared Channel (PUSCH)) for another cell are transmitted simultaneously.

In an exemplary case where the random access transmission is performed to acquire uplink timing in a specific cell (e.g. cell A), it is possible for other cells (e.g. cells B and C) have a valid uplink timing different from that of the specific cell to perform uplink transmission regardless of the random access transmission in the specific cell for acquiring the uplink timing.

In the above example, it is assumed the cells B and C has to have an uplink timing different from that of the cell A performing the random access to acquire uplink timing and have acquired and maintained the valid uplink timing currently. That is, in the above example, the random access transmission in the specific cell and non-random access uplink channels in other cells occur simultaneously.

In the above case, the UE processes the random access transmission with priority as compared to the non-random access uplink channels in other cells. The reason for processing the random access transmission with priority as compared to the non-random access uplink channels in other cells is to guarantee the random access transmission, giving up the non-random access uplink channel transmission, even when the reliability of simultaneous transmission of the random access channel and non-random access uplink channel transmissions are not guaranteed (e.g. shortage of uplink transmit power of the UE) or to transmit the random access channel at the original required transmit power and the non-random access uplink channels in other cells at the residual power.

In an another embodiment, the UE may processes the non-random access uplink channels in other cells with priority as compared to the random access transmission.

In an another embodiment, the UE may processes the uplink transmission of PCell with priority among the random access channel in one cell and non-random access uplink channels in other cells. In this case, if the random access channel is of the PCell, the random access channel is transmitted with priority as compared to the non-random access uplink channels in other cells; and otherwise if the random access channel is not of the PCell (i.e. random access channel of an SCell) and if non-random access channel in the PCell is required to be transmitted simultaneously, the non-random access channel in the PCell is transmitted with priority.

Figure 1:
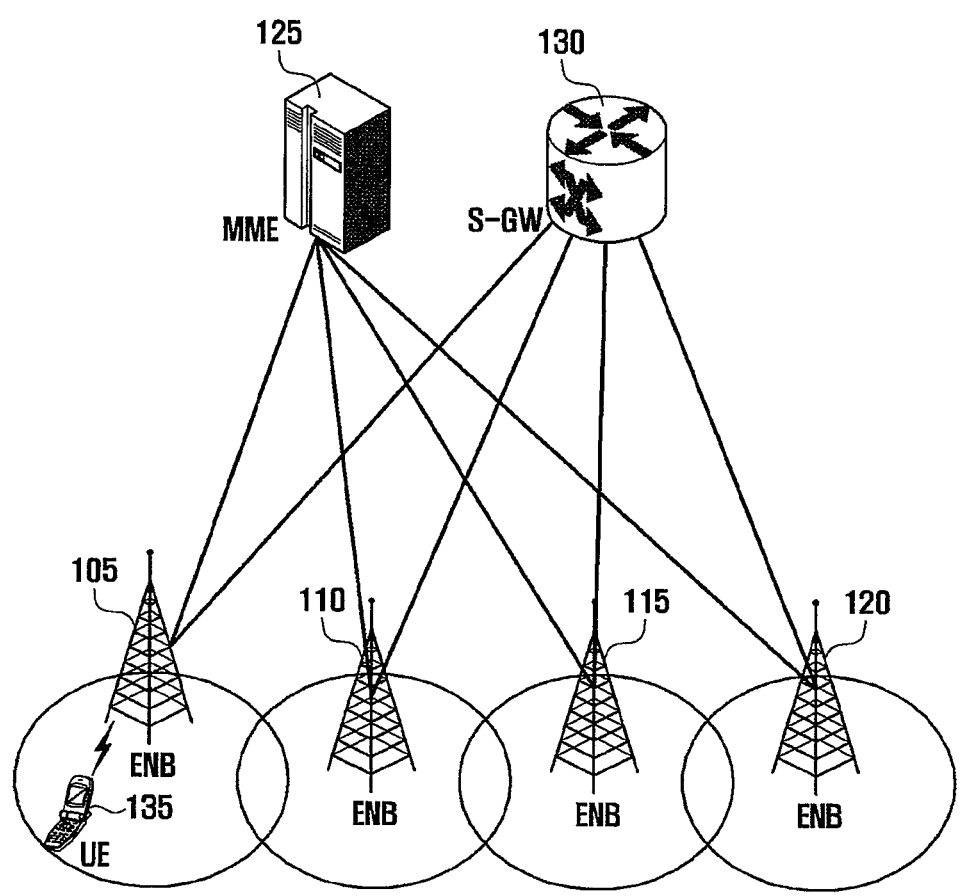
FIG. 1 is a diagram illustrating network architecture of a 3GPP LTE system according to an embodiment of the present disclosure.

FIG. 1 is a diagram illustrating network architecture of a 3GPP LTE system according to an embodiment of the present disclosure. According to an embodiment of the present disclosure, the LTE network includes evolved Node Bs (eNBs) 105, 110, 115, and 120, a Mobility Management Entity (MME) 125, and a Serving-Gateway (S-GW) 130. The User Equipment (hereinafter, referred to as UE) 135 connects to an external network via eNBs 105, 110, 115, and 120 and the S-GW 130. The User Equipment (UE) 135 connects to an external network through the eNB 105 and SGW 130. The eNBs 105, 110, 115, and 120 correspond to the legacy node B of UMTS system. The eNB 105 establishes a radio channel with the UE 135 and is responsible for complex functions as compared to the legacy node B.

In the LTE system, all the user traffic including real time services such as Voice over Internet Protocol (VoIP) are provided through a shared channel and thus there is a need of a device which is located in the eNB to schedule data based on the state information such as UE buffer conditions, power headroom state, and channel state. Typically, one eNB controls a plurality of cells. In order to secure the data rate of up to 100 Mbps, the LTE system adopts Orthogonal Frequency Division Multiplexing (OFDM) as a radio access technology.

Also, the LTE system adopts Adaptive Modulation and Coding (AMC) to determine the modulation scheme and channel coding rate in adaptation to the channel condition of the UE. The S-GW 130 is an entity to provide data bearers so as to establish and release data bearers under the control of the MME 125. MME 125 is responsible for various control functions and connected to a plurality of eNBs 105, 110, 115, and 120.

Figure 2:
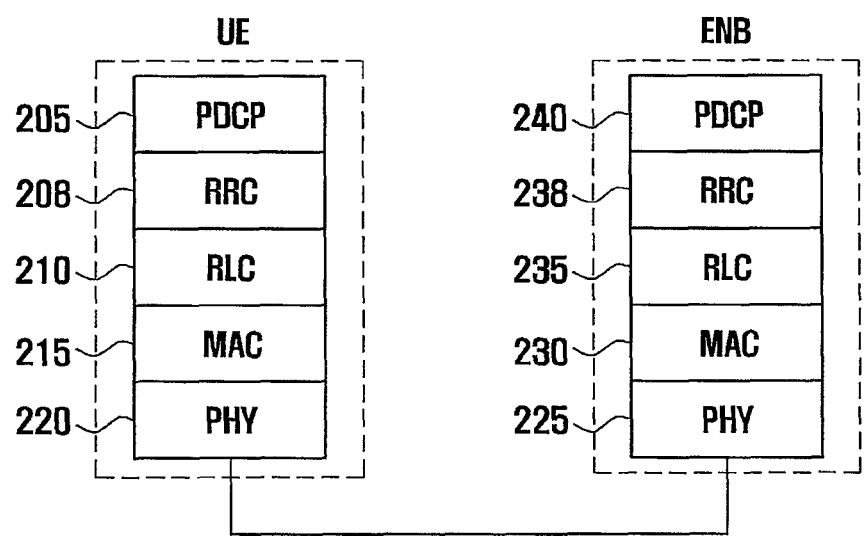
FIG. 2 is a diagram illustrating a protocol stack of the LTE system to which the present invention is applied.

FIG. 2 is a diagram illustrating a protocol stack of the LTE system to which the present invention is applied. Referring to FIG. 2, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225.

The PDCP is responsible for IP header compression/decompression, ciphering, and Integrity Protection. The RRC defines the higher layer control information message transmission and related operation/procedure for handling radio resource. The RLC is responsible for segmenting the PDCP Protocol Data Unit (PDU) into appropriate size.

The MAC is responsible for establishing connection to a plurality of RLC entities so as to multiplex the RLC PDUs into MAC PDUs and demultiplex the MAC PDUs into RLC PDUs. The PHY performs channel coding on the MAC PDU and modulates the MAC PDU into OFDM symbols to transmit over radio channel or performs demodulating and channel-decoding on the received OFDM symbols and delivers the decoded data to the higher layer.

Figure 3:
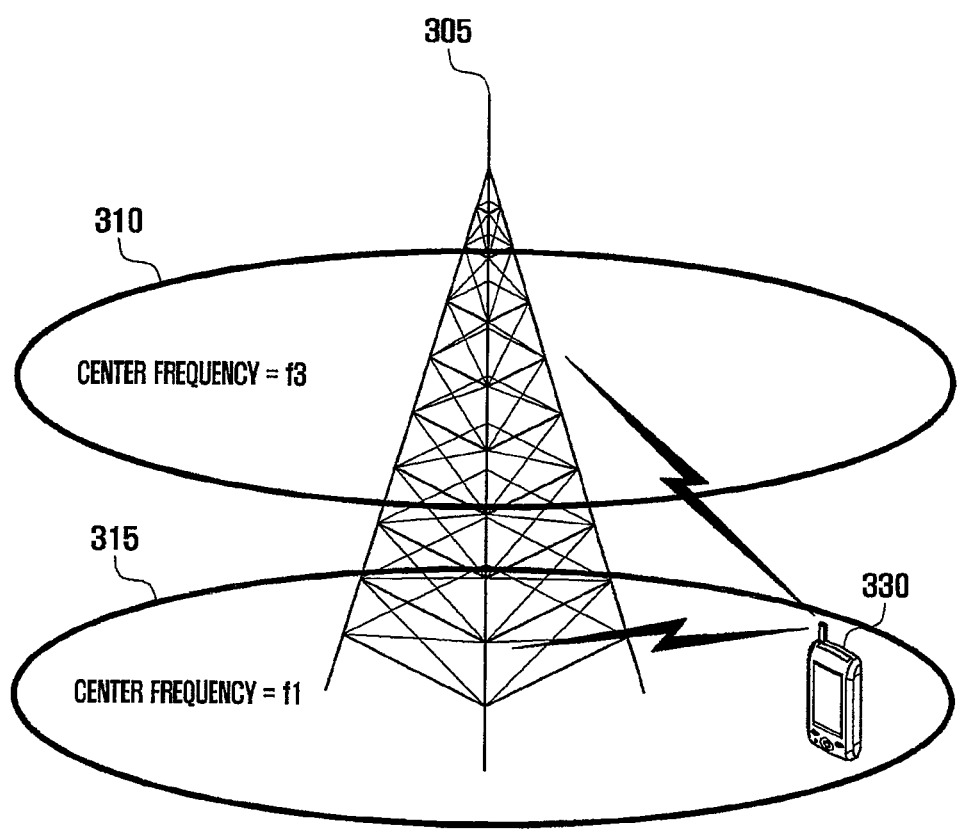
FIG. 3 is a diagram illustrating an exemplary situation of carrier aggregation in the LTE system to which the present invention is applied.

FIG. 3 is a diagram illustrating an exemplary situation of carrier aggregation in the LTE system to which the present invention is applied. Referring to FIG. 3, typically an eNB can use multiple carriers transmitted and receive in different frequency bands. For example, the eNB 305 can be configured to use the carrier 315 with center frequency f1 and the carrier 310 with center frequency f3. If carrier aggregation is not supported, the UE 330 has to transmit/receive data unit one of the carriers 310 and 315. However, the UE 330 having the carrier aggregation capability can transmit/receive data using both the carriers 310 and 315.

The eNB may increase the amount of the resource to be allocated to the UE having the carrier aggregation capability in adaptation to the channel condition of the UE so as to improve the data rate of the UE. Although the above description has been directed to the transmitter side of the eNB, it is applicable to the receiver side of the eNB in the same manner. Unlike the legacy UE transmitting data using one of the plurality carriers, the carrier aggregation-enabled terminal is capable of transmitting data using plural carriers simultaneously so as to increase the data rate.

In case that a cell is configured with one downlink carrier and one uplink carrier as a conventional concept, the carrier aggregation can be understood as if the UE communicates data via multiple cells. With the use of carrier aggregation, the peak data rate increases in proportion to the number of aggregated carriers.

In the following description, the phrase "the UE receives data through a certain downlink carrier or transmits data through a certain uplink carrier" means to transmit or receive data through control and data channels provided in a cell corresponding to center frequencies and frequency bands of the downlink and uplink carriers. Although the description is directed to an LTE mobile communication system for explanation convenience, the present invention can be applied to other types of wireless communication systems supporting carrier aggregation.

Figure 4:
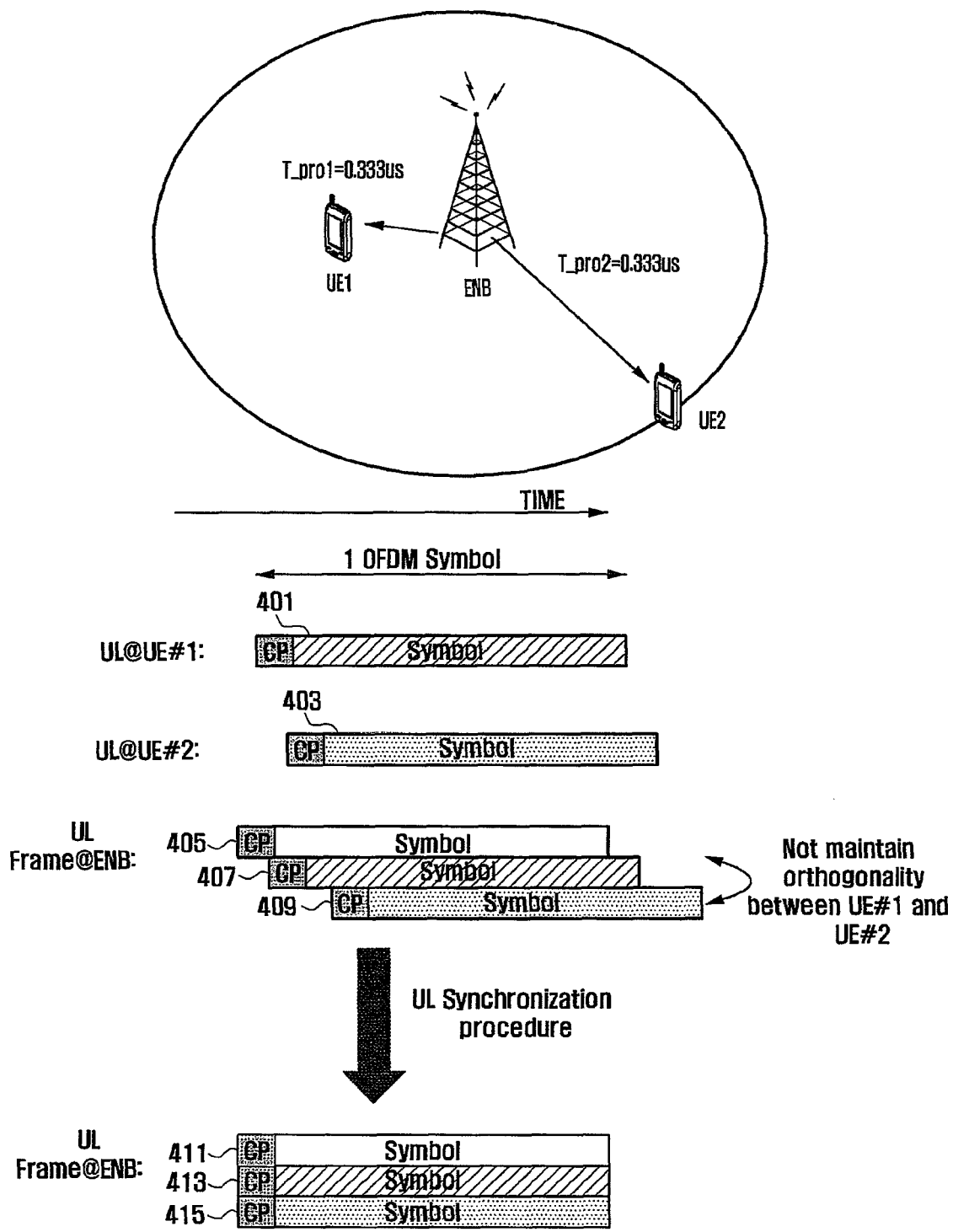
FIG. 4 is a diagram illustrating a principle of uplink timing synchronization in the OFDM-based 3GPP LTE system to which the present invention is applied.

FIG. 4 is a diagram illustrating a principle of uplink timing synchronization in the OFDM-based 3GPP LIE system to which the present invention is applied. The UE1 is located near the eNB and the UE2 is located far from the eNB.

T_pro1 indicates the first propagation delay time to the UE1, and T_pro2 indicates the second propagation delay to the UE2. The UE1 locates near the eNB as compared to the UE2 and thus has a relatively short propagation delay (in FIG. 4, T_pro1 is 0.333 us, and T_pro2 is 3.33 us).

The initial uplink timing of the UE 1 and UE 2 within a cell of the eNB mismatches the uplink timings of the UEs with the cell found by the eNB. Reference number 401 denotes uplink OFDM symbol transmission timing of the UE1, and reference number 403 denotes uplink OFDM symbol transmission timing of the UE2.

By taking notice of the uplink transmission propagation delays of the UE1 and UE2, the eNB may receive the uplink OFDM symbols at the timings as denoted by reference numbers 407 and 409. The UE1's uplink symbol is received by the eNB at the timing 407 with a short propagation delay while the UE2's uplink symbol transmitted is received by the eNB at the timing 409 with relatively long propagation delay.

Reference number 405 denotes a reference reception timing of the eNB. Since the timings 407 and 409 precede the synchronization between the uplink transmission timings of the UE1 and UE2, the uplink OFDM symbol reception and decoding start timing 405 of the eNB, the UE1's uplink OFDM symbol reception timing 407, and the UE2's uplink OFDM symbol reception timing 409 are different among each other. In this case, the uplink symbols transmitted by the UE1 and UE2 are not orthogonal so as to interfere to each other and, as a consequence, the eNB is likely to fail decoding the uplink symbols transmitted, at the timing 401 and 403, by the UE1 and UE2 due to the interference and the mismatch between the uplink symbol reception timings 407 and 409.

Uplink timing synchronization is a procedure for acquiring the eNB's uplink symbol reception timings with the UE1 and UE2 and, if the uplink timing synchronization procedure completes, the eNB receives uplink OFDM symbol to acquire decoding start timing as denoted by reference numbers 411, 413, and 415. In the uplink timing synchronization procedure, the eNB transmits Timing Advance (hereinafter, referred to as TA) information to the UEs to notify of the timing adjustment amount.

The TA information may be transmitted in the Random Access Response (RAR) message in response to the random access preamble transmitted by the UE for initial access or in the Timing Advance Commence MAC Control Element (TAC MAC CE).

Figure 5:
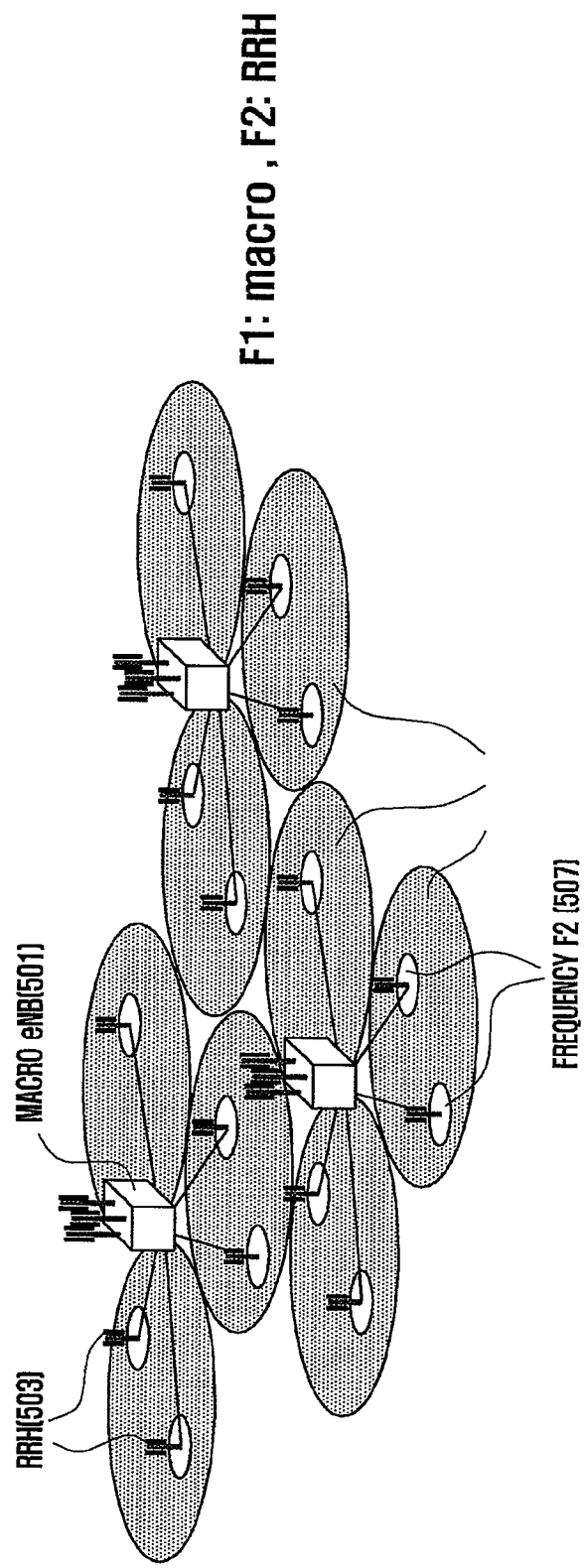
FIG. 5 is a diagram illustrating an exemplary scenario requiring a plurality of uplink timings in carrier aggregation.

FIG. 5 is a diagram illustrating an exemplary scenario requiring a plurality of uplink timings in carrier aggregation. The Remote Radio Heads (RRHs) 503 operating on frequency band F2 507 are deployed around the macro eNB 501 using frequency band F1 505.

If the UE uses both the macro eNB and RRH (i.e. if the UE near the RRH 503 aggregates F1 frequency band and F2 frequency band for uplink transmission), the downlink/uplink transmission between the UE and the RRH has short propagation delay and the downlink/uplink transmission between the UE and the macro eNB has relatively long propagation delay. This means that the uplink transmission timing to the RRH differs from the uplink transmission timing to the macro eNB. There is a need of a plurality of uplink transmission timings in the above carrier aggregation scenario and, in order to acquire initial uplink transmission timing, it is necessary to configure an uplink transmission timing through random access procedure on F2 for the RRH and another plink transmission timing through random access procedure on F1 for the macro eNB.

This means that if multiple uplink transmission timings exist in the carrier aggregation it is necessary to perform the random access procedure in multiple cells for synchronizing the uplink transmission timing (It is not necessary to perform the random access procedures at the same timings in the plural cells).

In the present disclosure, the carriers having the same uplink timings are sorted into a Timing Advance Group (TAG). For example, if one PCell and three SCells A, B, and C are aggregated, the PCell and SCell A have the same uplink timing, and the SCell B and SCell C have the same uplink timing, the PCell and SCell A may be grouped into TAG#0 and the SCell B and SCell C into TAB#1.

The TAG#0 including the PCell is referred to as Primary TAG (PTAG) and the TAG#1 including no PCell is referred to as STAG. PCell is the serving cell operating on the primary carrier to which RRC Connection Establishment has been performed initially or the Handover (HO) target cell.

Figure 6:
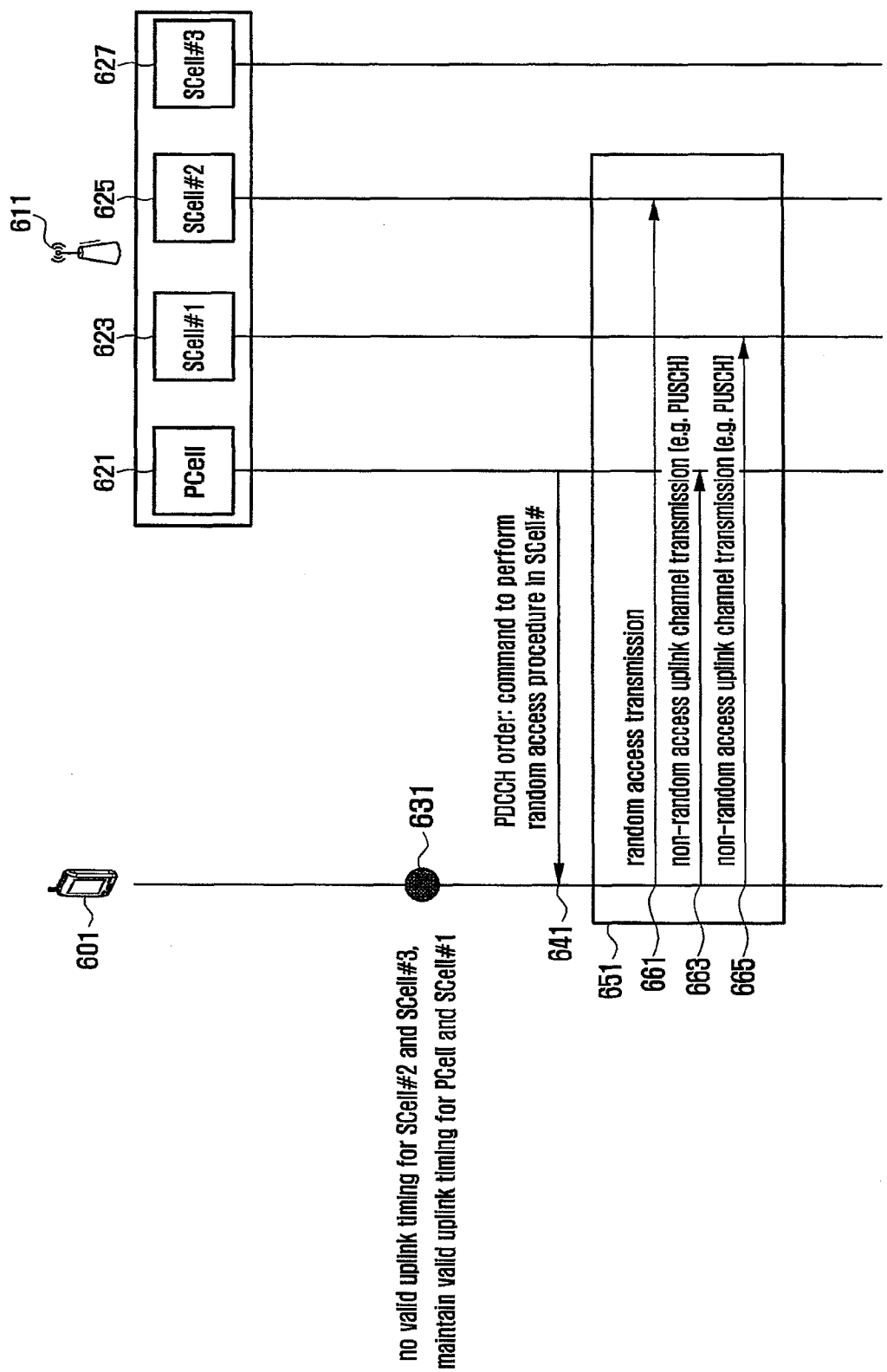
FIG. 6 is a diagram illustrating an exemplary case where a random access channel of a certain cell and non-random access uplink channels of other cells are transmitted simultaneously.

FIG. 6 is a diagram illustrating an exemplary case where a random access channel of a certain cell and non-random access uplink channels of other cells are transmitted simultaneously. Reference number 601 denotes a UE operating in carrier aggregation mode and reference number 611 denotes an eNB controlling the serving cells of aggregated carriers.

In FIG. 6, it is assumed that total 4 serving cells (PCell 621, SCell#1 723, SCell#2 625, and SCell#3 627) operating on the primary and secondary carriers are used in the carrier aggregation and the PCell and SCell#1 have the same uplink transmission timing and the SCell#2 and SCell#3 have the same uplink timing (the uplink timing of the PCell and SCell#1 and the uplink timing of the SCell#2 and SCell#3 are different from each other).

If the UE 601 maintains the valid uplink transmission timing for the PCell and SCell#1 but has no valid uplink transmission timing information on the SCell#2 and SCell#3 at operation 631, the eNB commands to UE to perform a random access procedure in the SCell#2 to acquire uplink transmission timing information for the SCell#2 and SCell#3 before starting data transmission through the SCell#2 and SCell#3 at operation 641. The command message may be the PDCCH order message specified in TS36.212 PHY.

If the random access procedure command for the SCell#2 is received, the UE 601 transmits a random access preamble through the SCell#2 using an open loop power control at operation 661. Since the valid uplink transmission timing for the PCell and SCell#1 is maintained, there may be any uplink transmission in the PCell and SCell#1 at the timing of transmitting the Random Access Preamble through the SCell#2 (configured according to previously received uplink scheduling information or semi-statically) and, in this case, the non-random access uplink channel (e.g. Physical Uplink Shared Channel (PUSCH)) transmissions 663 and 665 may occur in the PCell and SCell#1 at the same time as the Random Access Preamble transmission 651 in the SCell#2 (in the same subframe).

Figure 7:
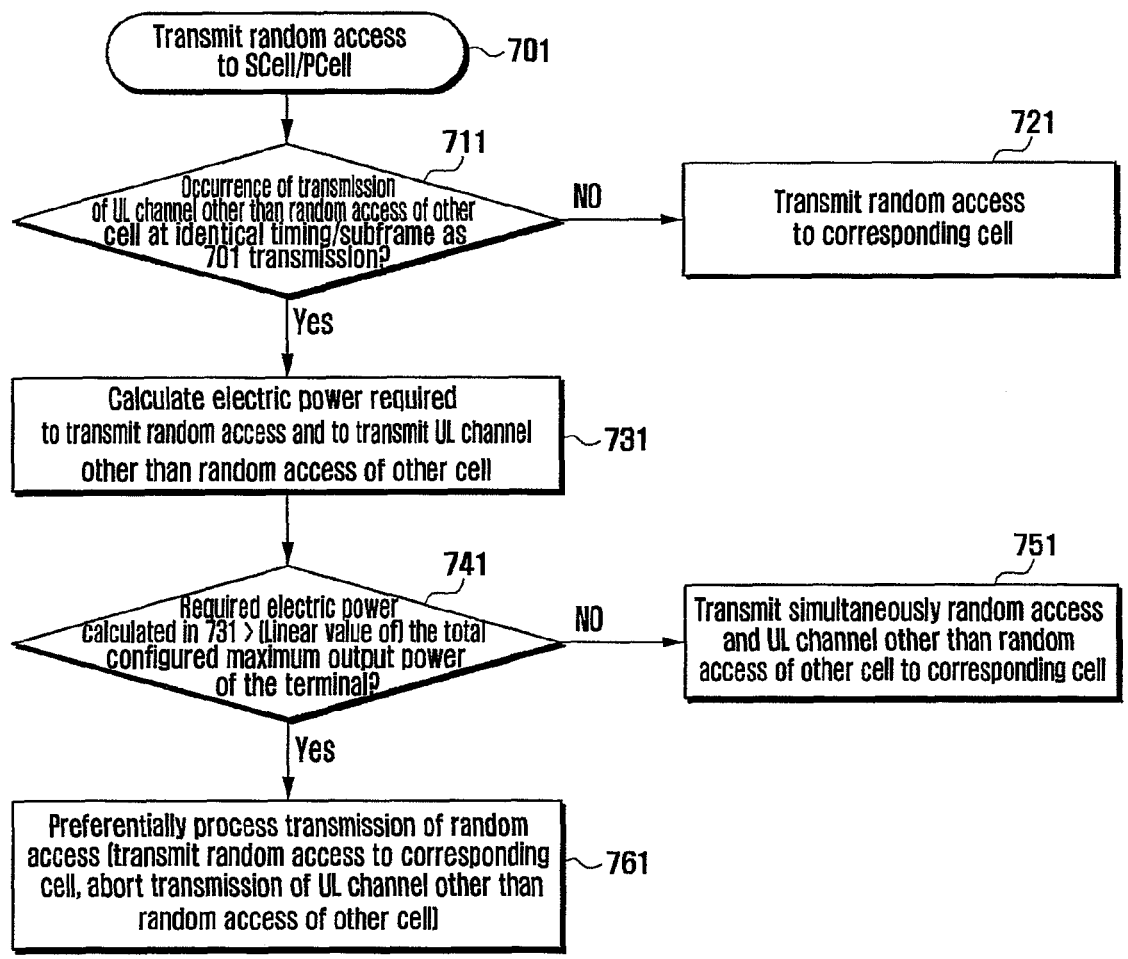
FIG. 7 is a flowchart illustrating a UE procedure of handling the case of FIG. 6 according to an embodiment of the present disclosure.

FIG. 7 is a flowchart illustrating a UE procedure of handling the case of FIG. 6 according to an embodiment of the present disclosure.

If a random access transmission occurs in a SCell or PCell at operation 701, the UE checks whether there is any non-random access Uplink (UL) channel transmission in other cells at the same timing/subframe as the random access transmission at operation 711. If there is only the random access transmission, the random access transmission is performed as scheduled in the corresponding cell at operation 721.

Otherwise if any non-random access UL channel transmission occurs in other cells, the UE calculates the sum of the transmit powers required for transmitting the random access channel and non-random access uplink channel in other cells at operation 731. The transmit power required for random access transmission may be calculated using the following equation.

PPRACH=min{$P_{CMAX,c}(i)$,PREAMBLE_RECEIVED_TARGET_POWER+$PL_C$}_[dBm]

$P_{PRACH}$: random access preamble transmission power
$P_{CMAX,c}(i)$: configured UE output power for SCell or PCell transmitting random access channel PREAMBLE_RECEIVED_TARGET_POWER=preambleInitialReceivedTargetPower+DELTA_PREAMBLE+(PREAMBLE_TRANSMISSION_COUNTER−1)*powerRampingStep preambleInitialReceivedTargetPower: value signaled by eNB through RRC layer message for open-loop power control of random access transmission DELTA_PREAMBLE: power adjustment value determined depending on the formation of random access preamble to be transmitted PREAMBLE_TRANSMISSION_COUNTER: number of random access preamble transmission times powerRampingStep: power offset value applied between consecutive random access transmissions (i.e. the power for second random access transmission increases as much as powerRampingStep power offset value as compared to the first random access transmission)

$PL_C$: Pathloss estimation value calculated based on the pathloss reference cell The sum of the powers required for transmitting non-random access uplink channels, i.e. PUSCH transmit powers, in other cells may be calculated using the following equation:

PUSCH transmit power calculation example 1 (UE does not transmit PUSCH and PUCCH simultaneously)

$$P_{PUSCH,c}(i) = \min\left\{ \begin{array}{c} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right\}$$

PUSCH transmit power calculation example 1 (UE transmits PUSCH and PUCCH simultaneously)

$$P_{PUSCH,c}(i) = \min\left\{ \begin{array}{c} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right\}$$

In the above equations, Pcmax,c (i) denotes the configured UE transmit power at subframe i in the serving cell c. PLc denotes the pathloss in the reference cell configured to provide the path loss for use in the serving cell c. The pathloss for used in determining the uplink transmit power in a certain serving cell may be the pathloss on the downlink channel of the corresponding cell or the path loss on the downlink channel of a different cell. The eNB notifies the UE of the pathloss to be used in the call setup procedure.

fc(i) denotes a value of accumulation of the Transmission Power Control in the serving cell c. PO_PUSCH,C denotes a higher layer parameter as the sum of cell-specific and UE-specific values. αc denotes a weight applied to the pathloss in calculating the uplink transmission power with 3-bit cell-specific value provided from the higher layer (i.e. the larger this value is, the more the pathloss influences to the uplink transmit power).

Although the description is directed to the case where the PUSCH is non-random access uplink channel transmitted in other cells, the non-random access uplink channel may be other channels such as Physical Uplink Control Channel (PUCCH) and Sounding Reference Symbol (SRS).

However, if there is PUCCH and SRS transmission, a different required power calculation formula may be applied. Detailed descriptions on the calculation of the required transmit power of PUCCH and SRS may be acquired by referencing the 3GPP TS36.213 E-UTRA Physical Layer Procedure.

PUSCH is a physical channel carrying the control information or data of the higher layer such as MAC and RRC, PUCCH is a physical channel carrying PHY layer control information (e.g. Scheduling Request (SR), Channel Quality Information (CQI), and Hybrid ARQ (HARQ) Acknowledgement information), and SRS is the physical channel carrying PHY control information for use in uplink channel estimation at the eNB.

The UE checks whether the sum of the powers required for the random access transmission and non-random access uplink channel transmission in other cells which has been calculated at operation 731 is greater than the total configured maximum UE output power of the UE at operation 741. The total maximum UE output power of the UE may be converted to a linear value for use.

If the sum of the required for transmission is not greater than the total maximum UE output power, the UE transmits the random access channel and the non-random access uplink channels in other cells simultaneously at operation 751.

Otherwise if the sum of the required for transmission is greater than the total maximum UE output power, the UE processes the random access transmission with priority at operation 761. That is, the UE transmits the random access channel in the corresponding cell as scheduled. However, the UEs does not transmit (gives up the transmission of) the non-random access uplink channel occurring simultaneously.

Although FIG. 7 is directed to the case that if it is difficult to transit both the random access channel and the non-random access uplink channel in other cell reliably (e.g. due to the uplink transmit power shortage of the UE) the UE processes the random access transmission with priority as compared to the non-random access uplink channel in other cell, it is also possible to process the non-random access uplink channel in other cell with priority as compared to the random access transmission.

In this case, the UE processes the non-random access uplink channel transmission in other cell with priority at operation 761 such that the non-random access uplink channel transmission in other cell is transmitted as scheduled but the random access transmission is cancelled (abandoned).

In another embodiment, the transmission priority of the random access channel and the non-random access uplink channel is determined depending on which of the random access channel and the non-random access uplink channel is transmitted in the PCell.

If the random access channel is of being transmitted in the PCell, the UE processes the random access transmission with priority at operation 761 (and gives up non-random access uplink channel transmission) and, otherwise if the non-random access uplink channel is of being transmitted in the PCell, the UE processes the non-random access uplink channel transmission with priority at operation 761 but cancels (gives up) the random access channel transmission.

Figure 8:
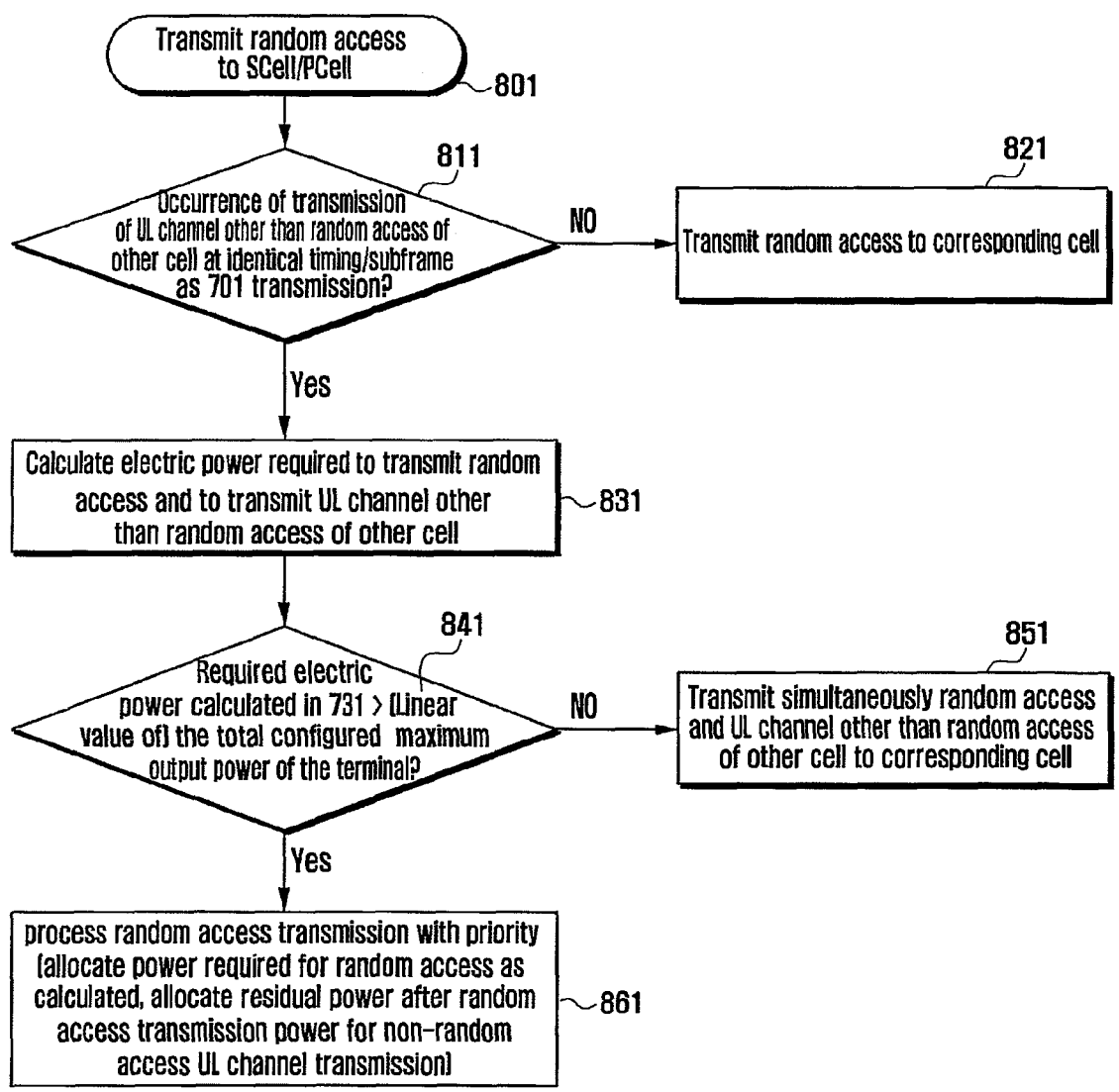
FIG. 8 is a flowchart illustrating a UE procedure of handling the case of FIG. 6 according to an embodiment of the present disclosure.

FIG. 8 is a flowchart illustrating a UE procedure of handling the case of FIG. 6 according to an embodiment of the present disclosure.

If a random access transmission occurs in a SCell or PCell at operation 801, the UE checks whether there is any non-random access Uplink (UL) channel transmission in other cells at the same timing/subframe as the random access transmission at operation 811.

If there is only the random access transmission, the random access transmission is performed as scheduled in the corresponding cell at operation 821. Otherwise if any non-random access UL channel transmission occurs in other cells, the UE calculates the sum of the transmit powers required for transmitting the random access channel and non-random access uplink channel in other cells at operation 831. The transmit power required for random access transmission may be calculated using the following equation.

$$P_{PRACH} = \min\{P_{CMAX,c}(i), PREAMBLE\_RECEIVED\_TARGET\_POWER + PL_C\}\_[dBm]$$

$P_{PRACH}$: random access preamble transmission power
$P_{CMAX,c}(i)$: configured UE output power for SCell or PCell transmitting random access channel PREAMBLE_RECEIVED_TARGET_POWER= preambleInitialReceivedTargetPower+DELTA_PREAMBLE+(PREAMBLE_TRANSMISSION_COUNTER−1)*powerRampingStep preambleInitialReceivedTargetPower: value signaled by eNB through RRC layer message for open-loop power control of random access transmission DELTA_PREAMBLE: power adjustment value determined depending on the formation of random access preamble to be transmitted PREAMBLE_TRANSMISSION_COUNTER: number of random access preamble transmission times powerRampingStep: power offset value applied between consecutive random access transmissions (i.e. the power for second random access transmission increases as much as powerRampingStep power offset value as compared to the first random access transmission)

$PL_C$: Pathloss estimation value calculated based on the pathloss reference cell The sum of the powers required for transmitting non-random access uplink channels, i.e. PUSCH transmit powers, in other cells may be calculated using the following equation:

PUSCH transmit power calculation example 1 (UE does not transmit PUSCH and PUCCH simultaneously)

$$P_{PUSCH,c}(i) = \min\left\{\begin{array}{c} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array}\right\}$$

PUSCH transmit power calculation example 1 (UE transmits PUSCH and PUCCH simultaneously)

$$P_{PUSCH,c}(i) = \min\left\{\begin{array}{c} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array}\right\}$$

In the above equations, Pcmax,c (i) denotes the configured UE transmit power at subframe i in the serving cell c. PLc denotes the pathloss in the reference cell configured to provide the path loss for use in the serving cell c. The pathloss for used in determining the uplink transmit power in a certain serving cell may be the pathloss on the downlink channel of the corresponding cell or the path loss on the downlink channel of a different cell. The eNB notifies the UE of the pathloss to be used in the call setup procedure.

fc(i) denotes a value of accumulation of the Transmission Power Control in the serving cell c. PO_PUSCH,C denotes a higher layer parameter as the sum of cell-specific and UE-specific values. αc denotes a weight applied to the pathloss in calculating the uplink transmission power with 3-bit cell-specific value provided from the higher layer (i.e. the larger this value is, the more the pathloss influences to the uplink transmit power).

Although the description is directed to the case where the PUSCH is non-random access uplink channel transmitted in other cells, the non-random access uplink channel may be other channels such as Physical Uplink Control Channel (PUCCH) and Sounding Reference Symbol (SRS). However, if there is PUCCH and SRS transmission, a different required power calculation formula may be applied.

Detailed descriptions on the calculation of the required transmit power of PUCCH and SRS may be acquired by referencing the 3GPP TS36.213 E-UTRA Physical Layer Procedure.

PUSCH is a physical channel carrying the control information or data of the higher layer such as MAC and RRC, PUCCH is a physical channel carrying PHY layer control information (e.g. Scheduling Request (SR), Channel Quality Information (CQI), and Hybrid ARQ (HARQ) Acknowledgement information), and SRS is the physical channel carrying PHY control information for use in uplink channel estimation at the eNB.

The UE checks whether the sum of the powers required for the random access transmission and non-random access uplink channel transmission in other cells which has been calculated at operation 831 is greater than the total configured maximum UE output power of the UE at operation 841. The total maximum UE output power of the UE may be converted to a linear value for use. If the sum of the required for transmission is not greater than the total maximum UE output power, the UE transmits the random access channel and the non-random access uplink channels in other cells simultaneously at operation 751.

Otherwise if the sum of the required for transmission is greater than the total maximum UE output power, the UE processes the random access transmission with priority at operation 861. That is, the UE transmits the random access channel in the corresponding cell as scheduled. However, the UEs does not transmit (gives up the transmission of) the non-random access uplink channel occurring simultaneously.

Although FIG. 8 is directed to the case that if it is difficult to transit both the random access channel and the non-random access uplink channel in other cell reliably (e.g. due to the uplink transmit power shortage of the UE) the UE processes the random access transmission with priority as compared to the non-random access uplink channel in other cell, it is also possible to process the non-random access uplink channel in other cell with priority as compared to the random access transmission.

In this case, the UE processes the non-random access uplink channel transmission in other cell with priority at operation 861 such that the non-random access uplink channel transmission in other cell is transmitted as scheduled but the random access transmission is performed at the residual power remained after allocating the power for use in transmitting the non-random access uplink channel in other cells.

In another embodiment, the transmission priority of the random access channel and the non-random access uplink channel is determined depending on which of the random access channel and the non-random access uplink channel is transmitted in the PCell.

If the random access channel is of being transmitted in the PCell, the UE processes the random access transmission with priority at operation 861 (transmits the random access channel at the required transmit power as allocated but the non-random access uplink channel in other cell at the transmit power available after the power allocation for the random access transmission); and otherwise if the non-random access uplink channel is of being transmitted in the PCell, the UE processes the non-random access uplink channel transmission with priority at operation 861 (transmits the non-random access uplink channel in other cell at the required transmit power as allocated but the random access channel at the transmit power available after the power allocation for the non-random access uplink channel in other cells).

Figure 9:
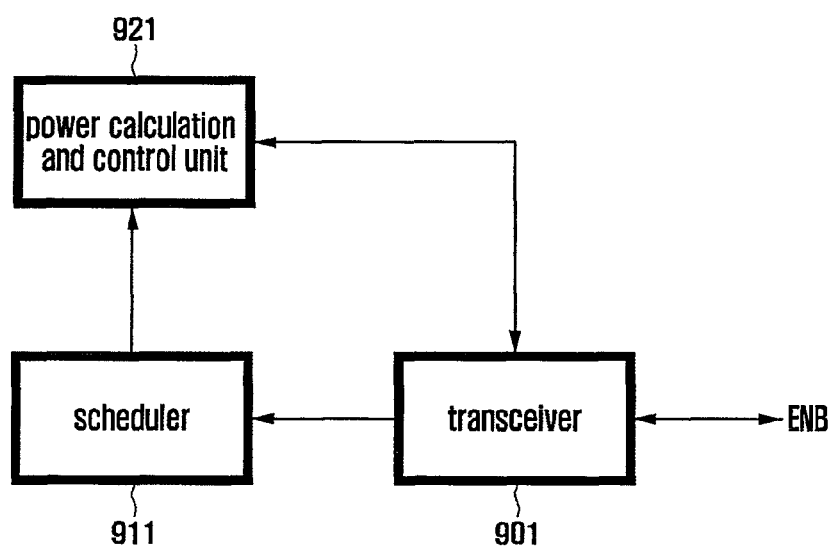
FIG. 9 is a block diagram illustrating a configuration of the UE according to embodiments of FIGS. 7 and 8.

FIG. 9 is a block diagram illustrating a configuration of the UE according to embodiments of FIGS. 7 and 8.

The UE receives downlink control information/data through a plurality serving cells established with the eNB by means of the transceiver 901 and performs random access transmission and non-random access uplink channel transmission in other cells. The transceiver may include at least one RF channel for a plurality of serving cells.

The power calculating and control unit 921 calculates required powers for random access and non-random access uplink channel transmission and allocates power for the random access and uplink channel transmissions.

The scheduler drops any of the random access and non-random access uplink channel transmission selectively according to the priority when the sum of the transmit powers required for transmitting the random access and non-random access uplink channels in other cells is greater than the total maximum UE output power.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A method for transmitting uplink information by a terminal in a wireless communication system, the method comprising:
    configuring multiple timing advance groups (TAGs);
    if a transmission of a random access preamble on a secondary serving cell in parallel with a transmission of an uplink signal in a different serving cell belonging to a different TAG is requested, identifying whether a total transmission power required for the transmission of the random access preamble and the transmission of the uplink signal exceeds a maximum terminal output power; and
    adjusting a transmission power of the uplink signal if the total transmission power exceeds the maximum terminal output power.

2. The method of claim 1, further comprising:
    transmitting the uplink signal on the different serving cell with the adjusted transmission power.

3. The method of claim 1, further comprising:
    transmitting the random access preamble on the secondary serving cell if the total transmission power exceeds the maximum terminal output power.

4. The method of claim 2, wherein the transmission power of the uplink signal is adjusted, so that the total transmission power does not exceed the maximum terminal output power.

5. The method of claim 2, wherein the transmission power of the uplink signal is adjusted if the uplink signal includes one of a physical uplink control channel (PUCCH) or a physical uplink shared channel (PUSCH).

6. The method of claim 2, wherein the transmission of the uplink signal is dropped if the uplink signal includes a sounding reference signal (SRS).

7. A terminal for transmitting uplink information to a base station in a wireless communication system, the terminal comprising:

a transceiver configured to transmit and receive a signal; and a controller configured to:

configure multiple timing advance groups (TAGs), if a transmission of a random access preamble on a secondary serving cell in parallel with a transmission of an uplink signal in a different serving cell belonging to a different TAG is requested, identify whether a total transmission power required for the transmission of the random access preamble and the transmission of the uplink signal exceeds a maximum terminal output power, and adjust a transmission power of the uplink signal if the total transmission power exceeds the maximum terminal output power.

8. The terminal of claim 7, wherein the controller is further configured to transmit the uplink signal on the different serving cell with the adjusted transmission power.

9. The terminal of claim 7, wherein the controller is further configured to transmit the random access preamble on the secondary serving cell if the total transmission power exceeds the maximum terminal output power.

10. The terminal of claim 8, wherein the transmission power of the uplink signal is adjusted, so that the total transmission power does not exceed the maximum terminal output power.

11. The terminal of claim 8, wherein a transmission power of the uplink signal is adjusted if the uplink signal includes one of a physical uplink control channel (PUCCH) or a physical uplink shared channel (PUSCH).

12. The terminal of claim 8, wherein the transmission of the uplink signal is dropped if the uplink signal includes a sounding reference signal (SRS).

13. A base station for receiving uplink information in a wireless communication system, the base station comprising:

a transceiver configured to transmit and receive a signal; and a controller configured to:

transmit first information on configuring multiple timing advance groups (TAGs) for a terminal, receive a random access preamble on a secondary serving cell of the terminal, based on determination that a transmission of the random access preamble on the secondary serving cell in parallel with a transmission of an uplink signal in a different serving cell belonging to a different TAG is requested, and based on determination that a total transmission power required for the transmission of the random access preamble and the transmission of the uplink signal exceeds a maximum terminal output power, and receive the uplink signal on the different serving cell with an adjusted transmission power.

14. The base station of claim 13, wherein a transmission power of the uplink signal is adjusted so that the total transmission power does not exceed the maximum terminal output power.

15. The base station of claim 13, wherein a transmission power of the uplink signal is adjusted if the uplink signal includes one of a physical uplink control channel (PUCCH) or a physical uplink shared channel (PUSCH).

16. The base station of claim 13, wherein the uplink signal is dropped if the uplink signal includes a sounding reference signal (SRS).

17. A method for receiving uplink information in a wireless communication system, the method comprising:

transmitting first information on configuring multiple timing advance groups (TAGs) for a terminal;

receiving a random access preamble on a secondary serving cell of the terminal, based on determination that a transmission of the random access preamble on the secondary serving cell in parallel with a transmission of an uplink signal in a different serving cell belonging to a different TAG is requested, and based on determination that a total transmission power required for the transmission of the random access preamble and the transmission of the uplink signal exceeds a maximum terminal output power; and receiving the uplink signal on the different serving cell with an adjusted transmission power.

18. The method of claim 17, wherein a transmission power of the uplink signal is adjusted so that the total transmission power does not exceed the maximum terminal output power.

19. The method of claim 17, wherein a transmission power of the uplink signal is adjusted if the uplink signal includes one of a physical uplink control channel (PUCCH) or a physical uplink shared channel (PUSCH).

20. The method of claim 17, wherein the uplink signal is dropped if the uplink signal includes a sounding reference signal (SRS).

* * * * *